United States Patent [19]
Schroeder

[11] Patent Number: 5,642,691
[45] Date of Patent: Jul. 1, 1997

[54] THERMOSTAT ASSEMBLY FOR A MARINE ENGINE WITH BYPASS

[75] Inventor: Bruce A. Schroeder, Stillwater, Okla.

[73] Assignee: Brunswick Corporation, Lake Forest, Ill.

[21] Appl. No.: 594,347

[22] Filed: Jan. 30, 1996

[51] Int. Cl.$^6$ .................................................. F01P 7/14
[52] U.S. Cl. .......................................................... 123/41.09
[58] Field of Search .......................... 123/41.01, 41.08, 123/41.09; 236/34, 34.5, 101 A, 101 C

[56] References Cited

U.S. PATENT DOCUMENTS

| | | | |
|---|---|---|---|
| 3,319,614 | 5/1967 | Shanahan | 123/41.08 |
| 3,358,654 | 12/1967 | Shanahan et al. | 123/41.08 |
| 3,918,418 | 11/1975 | Horn | 123/41.08 |
| 3,921,600 | 11/1975 | Henning et al. | 123/41.08 |
| 4,312,304 | 1/1982 | Tymer | 123/41.74 |
| 4,320,798 | 3/1982 | Obernberger | 165/36 |
| 4,606,302 | 8/1986 | Huemer et al. | 123/41.1 |
| 4,728,306 | 3/1988 | Schneider | 440/1 |
| 4,768,492 | 9/1988 | Widmer et al. | 123/541 |
| 4,938,185 | 7/1990 | Doke | 123/41.08 |
| 5,121,787 | 6/1992 | Corbett | 164/235 |
| 5,275,231 | 1/1994 | Kuze | 236/34.5 |
| 5,329,888 | 7/1994 | Luckett et al. | 123/41.08 |

*Primary Examiner*—Thomas N. Moulis
*Attorney, Agent, or Firm*—Andrus, Sceales, Starke & Sawall

[57] ABSTRACT

A thermostat assembly for a marine engine having a closed loop cooling system provides an additional bypass for engine coolant flow. The assembly includes a housing having an inlet that receives engine coolant, a thermostat outlet that is connected to a heat exchanger, and a bypass outlet that is connected directly to a circulating pump that circulates engine coolant to the engine and bypasses the heat exchanger. A thermostat having a restricting plate is mounted in the thermostat outlet in the housing. The housing includes an internal structural standoff around the bypass outlet. When engine coolant enters the thermostat housing and the thermostat is closed, engine coolant passes between the thermostat restricting plate and the bypass standoff and flows through the bypass outlet directly to the circulating pump. This increases the flow of engine coolant to the engine when the engine is cold. When the engine begins to heat up the thermostat opens, coolant flows through the thermostat opening to a heat exchanger, and the restricting plate moves towards the standoff around the bypass outlet to divert the flow of engine coolant from the bypass outlet to the thermostat outlet. The thermostat restricting plate thereby acts as a shuttle valve directing engine coolant between the bypass outlet and the thermostat outlet.

11 Claims, 3 Drawing Sheets

THERMOSTAT ASSEMBLY FOR A MARINE ENGINE WITH BYPASS

FIELD OF THE INVENTION

The invention is a thermostat assembly in a closed loop cooling system for an internal combustion engine in a marine propulsion system. The invention is especially useful in a cooling system using a heat exchanger as disclosed in copending patent application, Ser. No. 08/591,963, entitled "Heat Exchanger For Marine Engine Cooling System", by Bruce A. Schroeder and J. Michael Horak, filed on even date herewith and incorporated by reference herein;.

BACKGROUND OF THE INVENTION

In a conventional cooling system for an internal combustion engine, the coolant is circulated by a circulating pump through the engine block, through the cylinder heads, eventually through the intake manifold. In an automobile, or other land vehicle, the coolant flows from the manifold through a radiator. Most marine engines do not have a radiator. In a marine engine having an open loop cooling system, sea water supplied by a sea water pump is used to directly cool the engine and is then discharged overboard.

Other marine engines, particularly those designed for use in salt water, have closed loop cooling systems. In a closed loop cooling system, an engine coolant circulates through the engine and then through the shell side of a shell and tube heat exchanger. Raw seawater from an ocean or lake is pumped through the tube side of the heat exchanger, so that excess heat from the engine coolant is transferred to the raw sea water stream. The sea water is then discharged in the ocean or lake. Thus, raw sea water never passes through the coolant passages of the engine, thus reducing corrosion within the system, which is especially important when operating in salt water.

In closed loop cooling systems, the flow of engine coolant through the heat exchanger is controlled by a thermostat, such as a thermostatically activated valve. The thermostat in a marine engine with a closed loop cooling system is usually located on the intake manifold. When the engine and engine coolant are cold, the thermostat is closed so that coolant does not pass through the heat exchanger. With the thermostat closed, a small portion of engine coolant flows through a bypass and returns a limited amount of coolant to the circulating pump, so that there is a sufficient engine coolant flow through the engine block while the system is warming up. While a limited amount of engine coolant is adequate when the engine warms up slowly, problems can occasionally exist if the operator runs the engine wide open before the engine and coolant have warmed up. Under these conditions, coolant flow through the engine bypass before the thermostat opens might not provide sufficient cooling. This can be critical because wide open operation can quickly lead to hot spots in an engine.

It can be appreciated that an improved thermostat that allows increased flow of coolant before the thermostat opens is desirable in a marine engine having a closed loop cooling system.

SUMMARY OF THE INVENTION

The invention is an improved thermostat assembly for a marine engine having a closed loop cooling system. The thermostat assembly includes a thermostat housing having a bypass outlet to increase the flow of engine coolant to the engine before the thermostat opens.

The thermostat assembly includes a housing or casing having a coolant inlet through which engine coolant is introduced into the housing. The housing also includes a bypass outlet and a thermostat outlet, which are preferably in axial alignment with one another. The thermostat outlet is connected to a heat exchanger that removes excess heat from the engine coolant and then returns the coolant to the circulating pump. The bypass outlet is connected directly to the circulating pump, therefore bypassing the heat exchanger. A thermostat is mounted within the thermostat outlet to control the flow of coolant to the heat exchanger.

In the preferred embodiment of the invention, an internal structural standoff surrounds the bypass outlet within the thermostat housing. The thermostat includes a restricting plate that is slightly spaced from the top of the standoff surrounding the bypass outlet.

When the thermostat is closed, engine coolant entering the housing inlet flows through the space between the thermostat restricting plate and the bypass standoff, and then through the bypass outlet. The bypass outlet, therefore, provides a path for the engine coolant to flow when the thermostat is in a closed position. From the bypass outlet, engine coolant flows directly to the circulating pump and is recirculated throughout the engine.

When the engine coolant heats up, the thermostat opens to allow coolant to flow through the thermostat outlet. Coolant flowing through the thermostat outlet flows to the heat exchanger and eventually to the circulating pump. Also, the restricting plate moves closer to the top of the bypass standoff. In this manner, the thermostat restricting plate diverts engine coolant from the bypass outlet to the thermostat outlet. The restricting plate acts as a shuttle valve to selectively divert the engine coolant through the bypass outlet or the thermostat outlet as the temperature of the coolant dictates.

When the thermostat is completely open, the restricting plate completely close off the bypass outlet or very nearly closes off the bypass outlet.

With the invention, there is increased circulation of engine coolant to the engine even when the engine coolant is cold and the thermostat is closed.

As a further advantage, the thermostat housing selectively diverts engine coolant to the heat exchanger when engine coolant temperature reaches a thermostat set temperature. Until that time, the bypass outlet allows an increased flow of engine coolant throughout the system.

Other objects and advantages will appear during the course of the following description.

BRIEF DESCRIPTION OF THE DRAWINGS

The drawings illustrate the best mode presently contemplated of carrying out the invention.

In the drawings.

DETAILED DESCRIPTION OF THE DRAWINGS

The drawings illustrate a closed loop cooling system for an internal combustion engine in a marine propulsion system, and in particular a thermostat assembly in accordance with the preferred embodiment of the invention.

Figure 1:
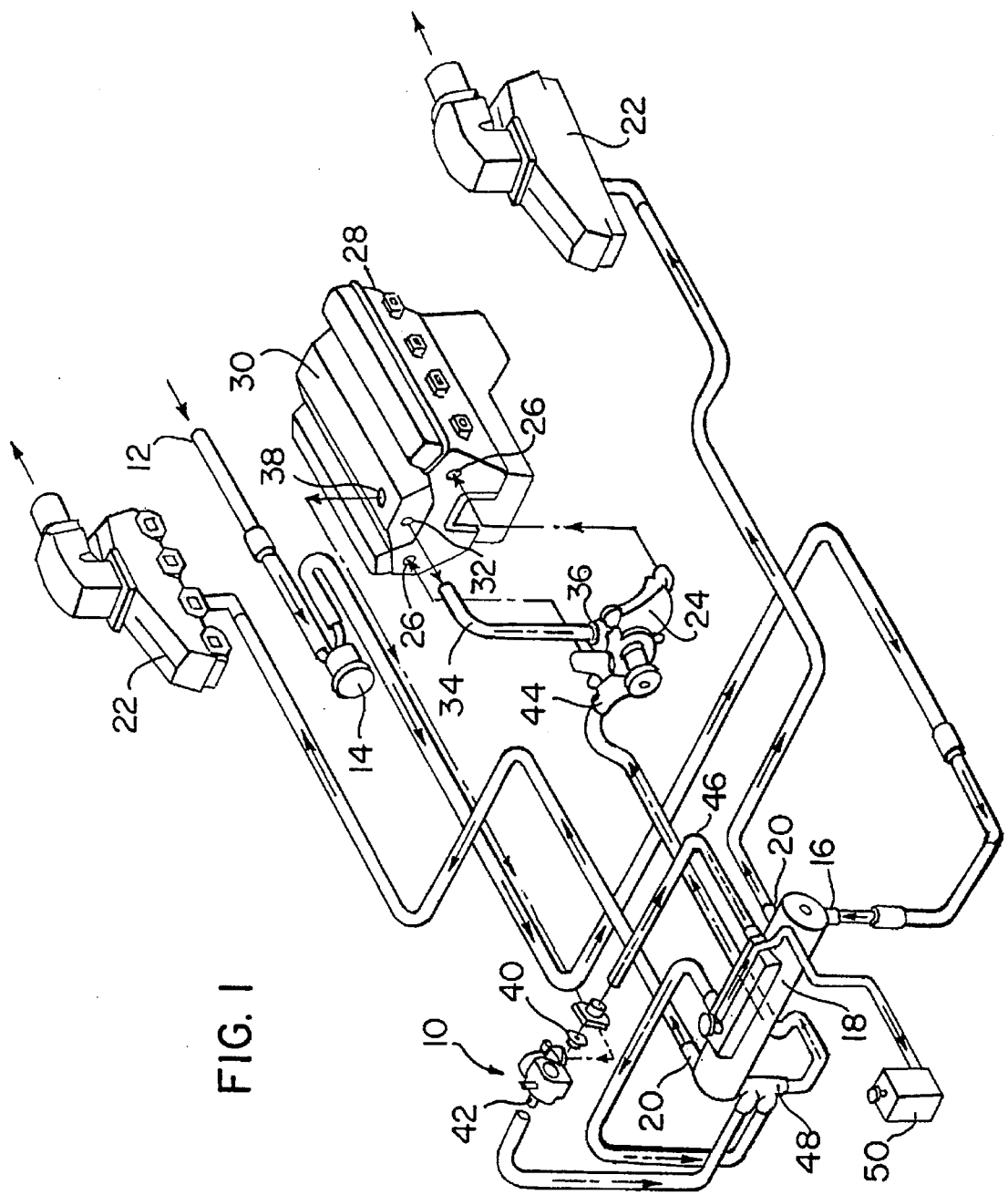
FIG. 1 is a schematic view illustrating a closed cooling system for a marine engine, including a thermostat housing in accordance with the invention.

FIG. 1 shows a closed cooling system for an internal combustion engine in an inboard or inboard/outboard marine propulsion system. The operation of the closed cooling system is as follows.

Referring to FIG. 1, raw sea water is introduced into the system through a sea water supply 12. A sea water pump 14 pumps the raw sea water to a sea water inlet 16 of a heat exchanger 18. The sea water flows through a series of tubes in the heat exchanger 18 and exits through a pair of sea water outlets 20 in the heat exchanger 18. The raw sea water passing through the heat exchanger 18 removes excess heat from engine coolant which passes through the shell side of the heat exchanger 18. Detailed operation of the heat exchanger 18 shown in FIG. 1 is the subject of the above-incorporated, copending patent application Ser. No. 08/591, 963, entitled "Heat Exchanger For Marine Engine Cooling System", filed by Bruce A Schroeder and J. Michael Horak on an even date herewith, which is hereby incorporated by reference.

The sea water leaving the heat exchanger 18 passes through a pair of exhaust manifolds 22 and discharges overboard. In this manner, the raw sea water, which oftentimes includes salt and other corrosive minerals, does not flow directly through the engine, thus preventing unwanted corrosion within the engine.

The flow of engine coolant through the system is now described with reference to FIG. 1. A circulating pump 24 pumps engine coolant into the engine block 28 through a pair of openings 26 in the engine block 28. The coolant circulates through the engine block 28 to cool the engine block 28 and piston heads contained therein. Engine coolant exits the engine block 28 through two openings 32 and 38 in the intake manifold 30.

Opening 32 in the engine block 28 is a direct engine bypass port 32. Coolant exiting the engine through the engine bypass port 32 flows through a bypass tube 34 to a bypass inlet 36 for the circulating pump 24. In this manner, engine coolant recirculates through the engine without passing through either the thermostat assembly 10 or the heat exchanger 18. A standard direct engine bypass opening 32 has a ⅝ inch diameter. In prior closed loop cooling systems, the direct engine bypass 32 was the only source of engine coolant to the circulating pump 24 when the engine coolant was cold and the thermostat 40 was closed.

Opening 38 through the top of the intake manifold 30 is a thermostat port 38. The thermostat port 38 supplies engine coolant to the thermostat assembly 10. When the temperature of the engine coolant is below a thermostat set temperature, the thermostat 40 remains closed and engine coolant flows from the thermostat 10 through a bypass outlet 42. In the preferred embodiment of the invention, the thermostat 40 opens when the engine coolant reaches approximately 160° F.

The bypass outlet 42 is connected through a series of tubes to a coolant inlet 44 for the circulating pump 24. In this manner, the bypass outlet 42 for the thermostat housing 10 allows engine coolant to bypass the heat exchanger 18 and be directly returned to the circulating pump 24. The additional flow of engine coolant through the bypass outlet 42 increases the flow of coolant when the thermostat 40 is closed by approximately 30%.

When the engine coolant reaches the thermostat set temperature, the thermostat 40 opens and allows engine coolant to flow through a heat exchanger supply tube 46 to the heat exchanger 18. Engine coolant passes the heat exchanger 18, at which time the sea water passing through the tubes in the heat exchanger 18 removes heat from the engine coolant. The coolant exits the heat exchanger 18 through a heat exchanger outlet 48 and flows to the coolant inlet 44 for the circulating pump 24. An additional supply of engine coolant is contained in a coolant recovery bottle 50 to replace any coolant that is somehow lost from the system.

In prior closed loop cooling systems, the thermostat assembly 10 did not include a bypass outlet 42. Therefore, when the engine coolant was below the thermostat set temperature, the only path for the engine coolant back to the circulating pump 24 was the engine bypass 32. The amount of coolant returning to the circulating pump 24 was limited in the previous systems by the diameter of the bypass tube 34.

Figure 2:
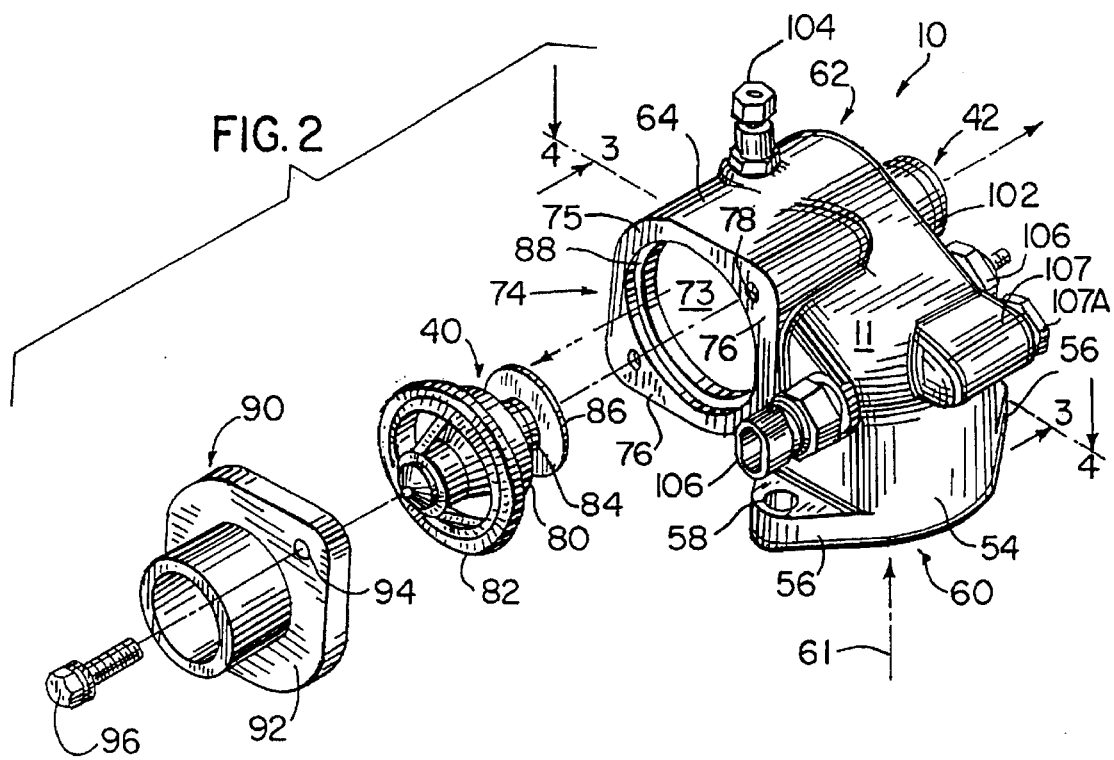
FIG. 2 is an exploded perspective view of a thermostat and thermostat housing in accordance with the invention.

Referring now to FIGS. 2–5, the detailed operation of the thermostat assembly 10 as it relates to the closed loop cooling system is now described. The primary components of the thermostat assembly 10 are the thermostat 40 and the thermostat housing 11. The thermostat housing 11 is compact and has a low profile. The housing 11 is preferably constructed of aluminum to eliminate corrosion. As can be seen in FIG. 2, the housing 11 includes a bottom wall 54 that has a pair of opposed outwardly extending flanges 56. The flanges 56 have holes 58 for mounting the housing 11 to the engine intake manifold 30.

Figure 4:
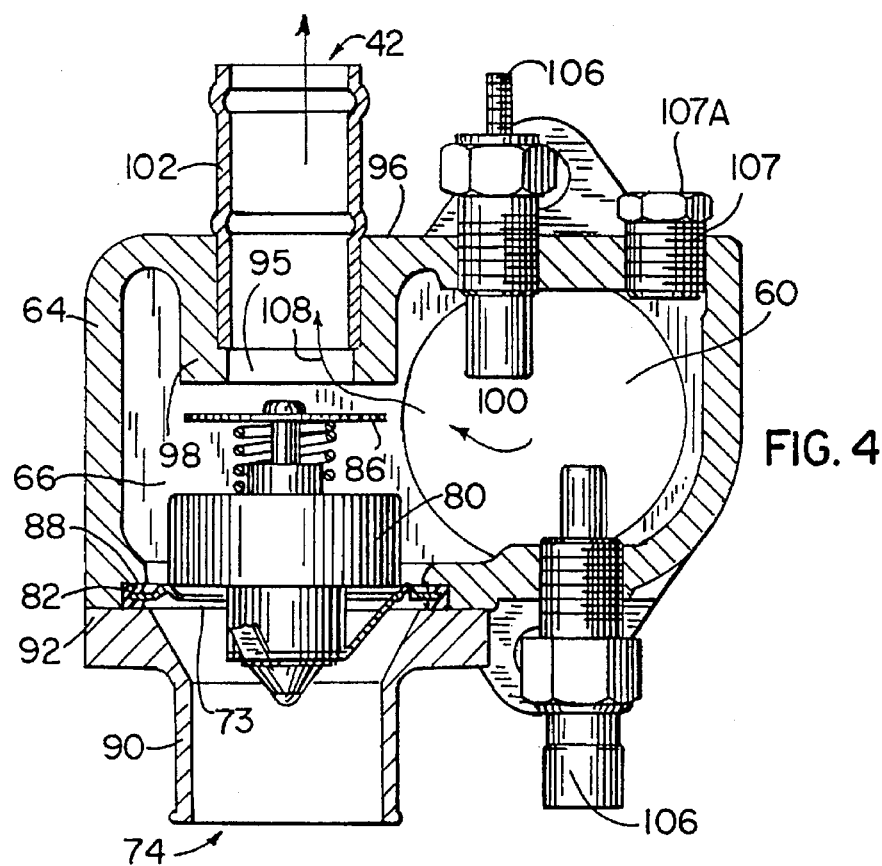
FIG. 4 is a sectional view taken along line 4—4 of FIG. 2 showing the thermostat in a closed position.

The bottom wall 54 defines a generally circular coolant inlet 60, FIG. 4, through which engine coolant enters the thermostat housing 11. Broken arrow 61 in FIG. 2 shows engine coolant flowing into the thermostat housing 11 through inlet 60. As was previously described, the coolant inlet 60 is in direct communication with the thermostat port 38 on the intake manifold 30 of the engine.

Figure 3:
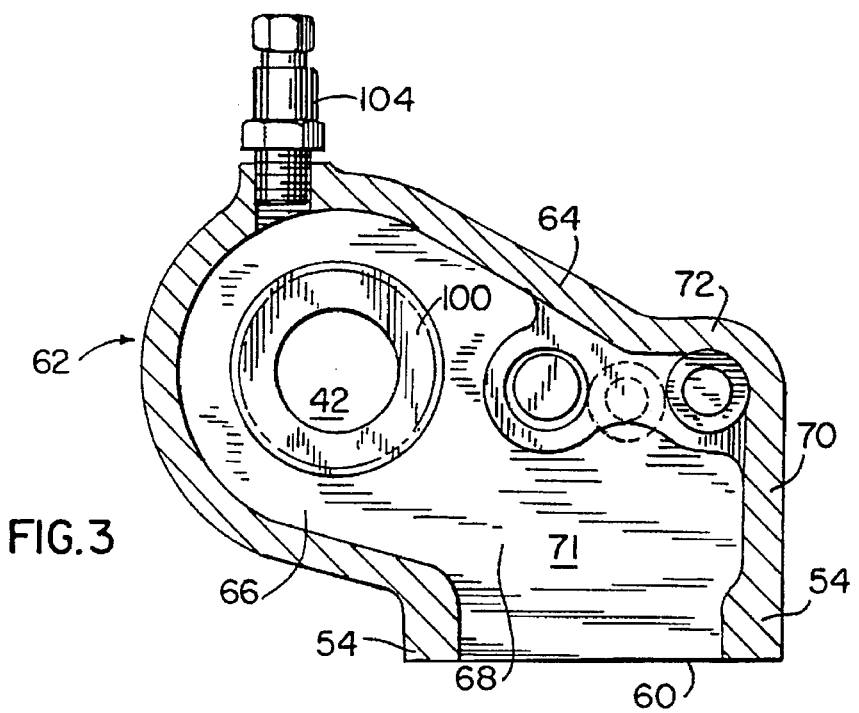
FIG. 3 is a sectional view taken along line 3—3 of FIG. 2.

Referring to FIG. 3, the thermostat housing 11 further includes an outlet portion 62 that is defined by an outer wall 64 surrounding an outlet chamber 66. The outlet chamber 66 communicates with the coolant inlet 60 by means of a coolant passageway 68, which allows coolant entering the thermostat housing 10 to travel from the coolant inlet 60 to the outlet chamber 66.

The thermostat housing 11 includes a vertical wall 70 that extends to a top wall 72. The bottom wall 54, vertical wall 70 and top wall 72 combine to define an inlet chamber 71. Top wall 72 then extends from the vertical wall 70 to the outer wall 64 of the outlet portion 62 of the thermostat housing 11. The outer wall 64 is arcuate and extends from the top wall 72 to the bottom wall 54. Engine coolant entering the coolant inlet 60 flows vertically into the inlet chamber 71, and is directed through passageway 68 into the outlet chamber 66.

As can be seen in FIG. 2, the outlet portion 62 contains a thermostat outlet 74, and a circular bypass outlet 42. The thermostat outlet 74 has a flat, planar face 75 with a circular opening 73. The thermostat outlet 74 further has a pair of flanges 76 containing a pair of mounting holes 78.

The thermostat outlet 74 is sized to receive a thermostat 40 consisting of a body section 80, an outer flange 82, a spring 84, and a restricting plate 86. The thermostat 40 preferably uses an expandable wax pill. The operation of the expandable wax pill thermostat is well known in the art.

Thermostat outlet 74 has a mounting ledge 88 contained slightly inward from the outer edge of face 75. The mounting ledge 88 engages the resilient outer flange 82 of the thermostat 40 to securely hold the thermostat 40 within the thermostat outlet 74, FIGS. 4 and 5. The depth of the mounting ledge 88 is slightly less than the thickness of the resilient outer flange 82.

After the thermostat 40 is positioned in the thermostat outlet 74, an outlet bracket 90 is placed over the thermostat 40 to securely hold the thermostat 40 within the housing 11. The outlet bracket 90 includes a base 92 having a pair of mounting holes 94 corresponding to mounting holes 78 in the thermostat housing 11. A pair of connectors 96 (only one shown) passing through the mounting holes 94 in the outlet bracket 90 into the mounting holes 78 around the thermostat outlet 74 are used to mount the outlet bracket 90 and secure the thermostat 40 within the thermostat outlet 74. Since the resilient outer flange 82 slightly extends past the face 75 around the thermostat outlet 74, the outer flange 82 is pressed between the inner surface of the base 92 of the outlet bracket 90 and the mounting ledge 88 to create a waterproof seal around the outside of the thermostat outlet 74.

Referring to FIG. 4, the circular bypass outlet 42 provides another flow path from the outlet chamber 66 of the housing 11 in the opposite direction of the flow path through the thermostat outlet 74. The bypass outlet 42 is preferably in axial alignment with the thermostat outlet 74. In the preferred embodiment of the invention, the coolant inlet 60 is contained in a horizontal plane and the openings for both the thermostat outlet 74 and the bypass outlet 42 are contained in an orthogonal vertical plane. Thermostat 40 is therefore mounted about a horizontal axis.

The bypass outlet 42 includes a circular opening 95 defined by a structural standoff 98 in the internal outlet chamber 66. The standoff 98 extends inwardly from a back wall 96 of the housing 11 into the outlet chamber 66 of the thermostat housing 11. An interior surface 100 of the standoff 98 is spaced from the restricting plate 86 of the thermostat 40 when the thermostat 40 is in a closed position.

A section of rigid tubing 102 is press-fit into bypass outlet opening 95. Tubing 102 provides a point of connection for coolant hose between the bypass outlet 42 and the circulating pump 24. Although the bypass outlet 42 is shown with a section of tubing 102 press fit into the thermostat housing 10, other methods of creating a point of connection integral with the back wall 96 of the thermostat housing 10 can also be employed.

A bleeder valve 104, FIGS. 2 and 3, is connected through the top of the outer wall 64, and provides means to bleed gases from the outlet chamber 66 that may be trapped within the coolant flow through the closed loop cooling system. The bleeder valve 104 is connected at the highest portion of the thermostat housing 11.

A temperature sensor 106 is affixed to the thermostat housing 11 to measure the coolant temperature in the housing 11. An electrical signal from the temperature sensor 106 can be transmitted to an indicator on the dashboard of the boat.

An auxiliary port 107 from inlet chamber 71 is provided to allow a portion of hot coolant to be drawn from the system to provide cabin heat or hot water heat. The drawings show a plug 107A in auxiliary port 107.

The operation of the thermostat housing 11 within the engine coolant system is now described. When the engine is initially started, the circulating pump 24 pumps engine coolant through the openings 26 in the engine block 28. The engine coolant circulates through the engine block 28 and exits the intake manifold 30 through the engine bypass opening 32 and through the thermostat port 38. The portion of engine coolant passing through the engine bypass 32 returns directly to the circulating pump 24 and is recirculated through the engine block 28.

The portion of the engine coolant flowing through the thermostat port 38 enters the thermostat housing 11 through the coolant inlet 60. Within the thermostat housing 11, the coolant flows through passageway 68 to the outlet chamber 66. When the engine is cold, the thermostat 40 is closed as shown in FIG. 4. When the thermostat 40 is closed, the thermostat body 80 blocks opening 73 through the thermostat outlet 74. Therefore, all the engine coolant entering the thermostat housing 11 must flow through the bypass outlet 42 when the thermostat 40 is closed.

As shown by arrow 108 in FIG. 4, engine coolant passes between the restricting plate 86 of the thermostat 40 and the interior surface 100 of standoff 98. The amount of coolant flowing through the bypass outlet 42 is determined in part by the flow between the interior surface 100 of the standoff 98 and the restricting plate 86. It is therefore important to select a standoff 98 height that allows an adequate amount of coolant to flow through the bypass outlet 42, but does not allow too much coolant to flow through the bypass outlet 42 which can cause cavitation problems in the cooling system. Although the thermostat housing 10 will work as described without a standoff 98, a standoff 98 having a height between 1-inch and 1 ¾ inches is preferred.

Along with the height of the standoff 98, the selection of the diameter of the bypass outlet opening 95 also controls the amount of coolant flowing through the bypass outlet 42. In the preferred embodiment of the invention, the diameter of the opening 95 is 1 inch, although other diameters have also proved to be effective.

Coolant traveling through the bypass outlet 42 travels directly to the circulating pump 24 without passing through the heat exchanger 18. By providing this additional bypass means when the engine is cold, the amount of coolant returning directly to the circulating pump 24 is greatly increased. For example, in a prior system not having the additional bypass 42, the flow of coolant through a cold engine is in the range of 50 gallons/minute, while a system having the bypass 42 can reach flow rates of approximately 80 gallons/minute.

Figure 5:
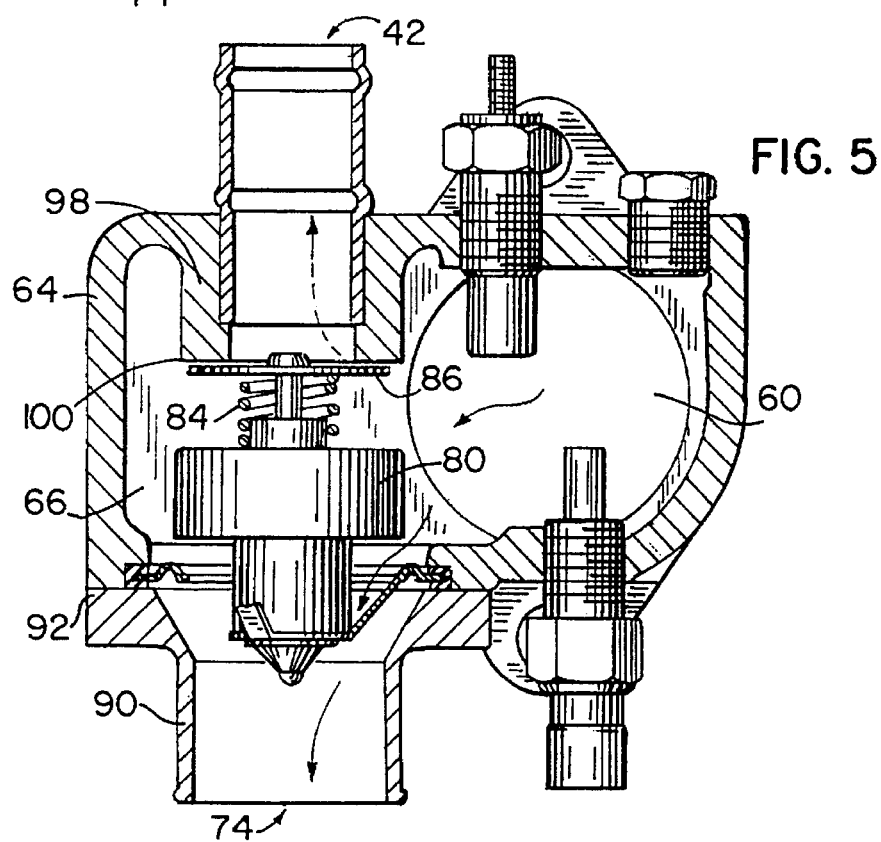
FIG. 5 is another sectional view taken along line 4—4 of FIG. 2 showing the thermostat in an open position.

FIG. 5 shows the thermostat 40 in an open or partially open position. As the temperature of the coolant flowing through the housing 10 increases to the activation temperature for the thermostat 40, the wax pill in the thermostat 40 expands, and thermostat body 80 moves away from opening 73 of thermostat outlet 74. The preferred thermostat 40 has an activation temperature of about 160° F. The opening of thermostat 40 allows a portion of the engine coolant to flow through the thermostat outlet 74 to the heat exchanger 18. As the thermostat 40 opens, the restricting plate 86 travels toward the standoff 98. The movement of plate 86 causes the flow area between the outlet chamber 66 and the bypass outlet 42 to decrease. Thus, as the coolant temperature increases, a larger portion of the coolant flow is directed through the thermostat outlet 74 and diverted away from the bypass outlet 32. When the thermostat 40 is in the wide open position, the restricting plate 86 either completely or very nearly completely shuts off the coolant flow through the bypass outlet 42.

With the invention, there is increased engine coolant flow to the circulating pump 24 and through the engine block 28 when the temperature of the engine coolant is below the temperature needed to activate the thermostat 40. Thus, the closed loop cooling system operates more effectively and efficiently to control the temperature of the engine block 28 during the period of time immediately following engine start-up.

Various modes of carrying out the invention are contemplated as being within the scope of the following claims.

We claim:

1. A thermostat assembly for an internal combustion engine in a marine propulsion system having a closed loop cooling system, comprising:

a housing adapted to be mounted to a horizontal top surface of an engine over a thermostat coolant port from the engine;

an inlet into said housing for introducing coolant to said housing, the inlet being contained in a horizontal plane when the housing is mounted to the engine;

a thermostat outlet in said housing providing a flow path to a heat exchanger for removing heat from the coolant;

a bypass outlet in said housing providing a flow path from said housing to a circulating pump for circulating coolant to the engine without flowing the coolant through the heat exchanger, wherein the bypass outlet is contained in a first vertical plane, the thermostat outlet is contained in a second vertical plane and the bypass outlet and the thermostat outlet are directed in opposite directions along a horizontal axis;

a first passage in said housing that communicates between said inlet and said bypass outlet and said thermostat outlet; and a thermostat horizontally mounted in said thermostat outlet to control the flow of coolant through said thermostat outlet, the thermostat also having a restricting plate to control flow of coolant through said bypass outlet without restricting flow through said bypass outlet until the engine is operating above normal engine operating temperature.

2. The assembly of claim 1, wherein the housing further comprises a bypass standoff formed in said housing that surrounds said bypass outlet.

3. The assembly of claim 2, wherein said bypass standoff extends from said housing a predetermined distance selected to limit the flow of coolant through said bypass outlet.

4. A thermostat assembly for an internal combustion engine in a marine propulsion system having a closed loop cooling system, comprising:

a housing that receives coolant from a thermostat coolant port from the engine;

an inlet into said housing for introducing coolant to the housing, from the thermostat coolant port in the engine, the inlet being contained in a first plane;

a thermostat outlet in the housing providing a first flow path to a heat exchanger that removes heat from the coolant;

a bypass outlet in the housing providing a second flow path to a circulating pump so that coolant is circulated to the engine without flowing the coolant through the heat exchanger, wherein the bypass outlet is contained in a second plane, the thermostat outlet is contained in a third plane which is parallel to the second plane and the bypass outlet and the thermostat outlet are directed in opposite directions along a horizontal axis;

a passage in said housing communicating between said inlet and said bypass outlet and thermostat outlet;

a thermostat mounted horizontally in said thermostat outlet to control the flow of coolant through the thermostat outlet, the thermostat also having a restricting plate which controls the flow of coolant through the bypass outlet; and a bypass standoff formed in said housing and surrounding said bypass outlet, said standoff spaced from said thermostat restricting plate so that said restricting plate moves toward said bypass standoff when said thermostat opens thereby allowing a portion of the coolant to flow through said thermostat outlet and controlling the flow of coolant through said bypass outlet without restricting flow through said bypass outlet until the engine is operating above normal engine operating temperature.

5. The assembly of claim 4, wherein said bypass outlet has a smaller cross-sectional area than said thermostat outlet.

6. The assembly of claim 4, wherein said housing further comprises a thermostat mounting ledge surrounding said thermostat outlet in said housing.

7. The assembly of claim 4, wherein said bypass outlet has a cross sectional area sized to provide adequate coolant flow when said thermostat is in a closed position.

8. The assembly of claim 4, wherein said thermostat restricting plate does not contact said bypass standoff when said thermostat is in a completely open position, thereby permitting coolant to flow through said bypass outlet at all times.

9. The assembly of claim 4, wherein said thermostat restricting plate contacts said bypass standoff when said thermostat is in a completely open position, thereby eliminating all coolant flow through said bypass outlet.

10. In a marine propulsion system having an internal combustion engine and a closed loop cooling system, the closed loop cooling system comprising;

an engine having a coolant inlet, a coolant outlet thermostat port and a coolant outlet direct bypass port;

a heat exchanger for removing heat from the engine coolant;

a circulating pump for circulating the engine coolant to the engine;

a first coolant flow path from the heat exchanger to the circulating pump;

a direct bypass tube connected between the coolant outlet direct bypass port on the engine and an inlet to the circulating pump so coolant flowing from the engine through the direct bypass port does not flow through the heat exchanger;

a thermostat assembly having a housing;

an inlet in said housing for introducing coolant to said housing from the coolant outlet thermostat port on the engine;

a bypass outlet in said housing;

a thermostat outlet in said housing;

a passage in said housing between said inlet and said bypass outlet and said thermostat outlet; and a thermostat mounted in said thermostat outlet to control the flow of coolant through the thermostat outlet;

a second coolant flow path from the thermostat outlet on the thermostat housing to the heat exchanger; and a secondary bypass flow path from the bypass outlet on the thermostat housing to the circulating pump without flowing through the heat exchanger.

11. The system of claim 10 wherein the thermostat has a restricting plate to restrict flow of coolant through said bypass outlet when the temperature of coolant flowing through the housing is sufficient to activate the thermostat and allow coolant to flow through the thermostat outlet.

* * * * *